United States Patent [19]

Penverne et al.

[11] 4,453,735

[45] Jun. 12, 1984

[54] INDEPENDENT WHEEL SUSPENSION DEVICE WITH BUILT-IN SHOCK ABSORBERS ESPECIALLY DESIGNED FOR TRAILERS

[75] Inventors: Albert Penverne, Sagy; Pierre W. Gobeaux, Gagny, both of France

[73] Assignee: F.T.F., Saone et Loire, France

[21] Appl. No.: 268,552

[22] Filed: Jun. 1, 1981

[30] Foreign Application Priority Data

Jun. 6, 1980 [FR] France ............................ 80 13034

[51] Int. Cl.³ .............................................. B60G 3/02
[52] U.S. Cl. .................................... 280/690; 280/697; 280/698; 280/701; 280/43.18; 267/33; 267/34
[58] Field of Search ............... 280/690, 697, 698, 701, 280/660, 662, 666, 670, 671, 43.17, 43.18; 267/33, 34

[56] References Cited

U.S. PATENT DOCUMENTS

| | | | |
|---|---|---|---|
| 3,591,198 | 7/1971 | Brando | 280/697 |
| 3,603,575 | 9/1971 | Arlasky | 267/34 |
| 4,178,005 | 12/1979 | Kent | 280/43.18 |
| 4,230,340 | 10/1980 | Wasservogel | 280/43.17 |

FOREIGN PATENT DOCUMENTS

772230 4/1957 United Kingdom ............... 280/662

*Primary Examiner*—Robert R. Song
*Attorney, Agent, or Firm*—Remy J. VanOphem

[57] ABSTRACT

A suspension device particularly for a trailer. On each side thereof the device includes a suspension arm whose free rear end supports a spindle and whose front end is interconnected with the frame by means of a pin carried by a fixed bracket. A shock absorbing element consisting of a soft material block and an elastic element consisting of a helical spring are mounted inside a common tubular housing which is interconnected with the fixed bracket. A push rod, interfacing with the spring and the block is pivotally mounted to the suspension arm. This device may include an optional telescoping cross member which can be welded together during the assembling operation.

20 Claims, 7 Drawing Figures

INDEPENDENT WHEEL SUSPENSION DEVICE WITH BUILT-IN SHOCK ABSORBERS ESPECIALLY DESIGNED FOR TRAILERS

BACKGROUND OF THE INVENTION

The present invention pertains to suspension devices and more particularly to suspension devices for trailers.

This invention is directed to the problem of providing an independent wheel suspension device including shock absorbers.

SUMMARY OF THE INVENTION

A vehicle suspension device according to the present invention includes at least one suspension arm whose free outboard end supports a spindle onto which a vehicle wheel is rotatably mounted. The inboard end of the suspension arm is interconnected with a fixed bracket rigidly mounted on the vehicle frame by means of a first pin which is parallel with the axis of the spindle. A shock absorbing element and a resilient element are mounted between the fixed bracket and the suspension arm. The above described suspension device is further characterized by the fact that the shock absorbing element may consist of a soft material block and the resilient element may consist of a helical compression spring. The shock absorbing element and the resilient element are mounted inside a common tubular housing having a circular cross-section. This housing is interconnected with the vehicle frame by means of a second pin disposed parallel to the first pin. A push rod, which slides axially inside the tubular housing, is interconnected at one end with the suspension arm by means of a third pin which is disposed parallel with the first and second pins. The other end of the push rod includes a threaded portion. A first nut is threaded onto the threaded portion of the push rod and is rigidly mounted with an intermediary washer pinched between the first end of the helical spring and one face of the soft material block. A second nut is also interconnected with the threaded portion of the push rod and presses a thrust washer against the other face of the soft material block. Both washers are provided with a predetermined amount of free play inside of the tubular housing. The second end of the helical spring abuts a stop piece which is rigidly mounted to the tubular housing and which includes a central hole through which the push rod is driven.

The assembly described provides a suspension housing which may be connected with another similar suspension housing on the opposite side of the vehicle by means of a cross member assembly including three elements; the two outer elements being slidable inside an intermediary element, and which can be welded during the assembling operation.

According to an additional feature of the present invention, the tubular housing extends in front of the third pin and remains slightly slanted while pivoting about the second pin in response to the oscillations of the suspension arm.

According to still another feature of the present invention, the plane passing through the longitudinal axis of the first pin and the longitudinal axis of the spindle and the plane passing through the longitudinal axes of the first and third pins define a dihedral angle.

According to another feature of the present invention, the main branch of the suspension arm is slightly bent so that the free end supporting the spindle is offset towards the outside of the vehicle relative to the end of the suspension arm which is mounted to the vehicle frame or onto a fixed bracket rigidly mounted with the frame.

According to still another feature of the present invention, the first and second pins are connected to the vehicle frame by means of a fixed bracket consisting of a longitudinal gutter whose opening is directed towards the ground so as to at least partially surround the tubular housing. The bottom of the gutter is attached under the vehicle frame. The first pin is rigidly mounted with the gutter wall. The wall facing the median axis of the vehicle is rigidly mounted, on its external face, with one of the extreme elements of the cross member.

The many objects, features and advantages of the present invention will become apparent to those skilled in the art when the following detailed description is read together with the drawings attached hereto.

DETAILED DESCRIPTION OF THE PREFERRED EMBODIMENT

Figure 1:
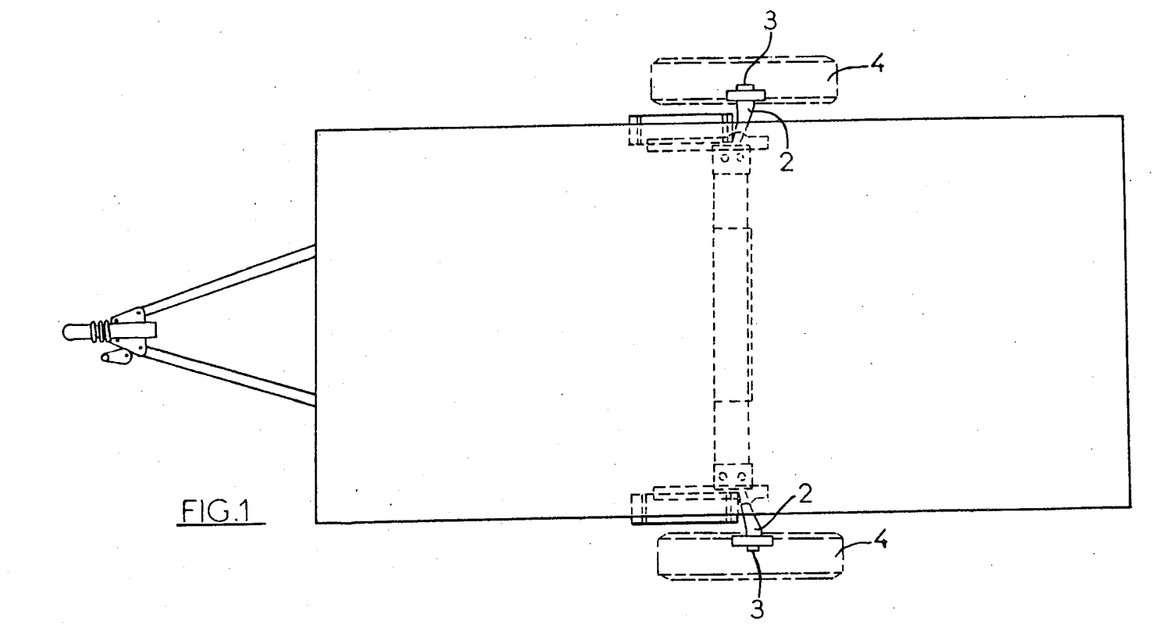
FIG. 1 is a top view of the frame of a trailer equipped with a suspension device according to the present invention.
Figure 2:
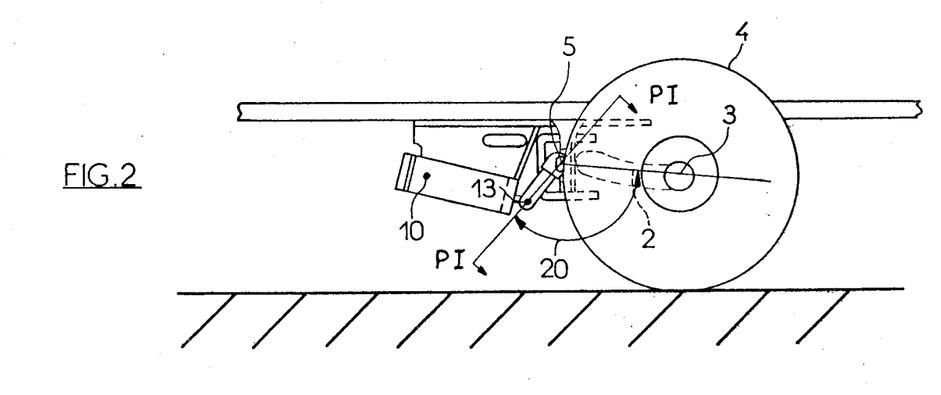
FIG. 2 is a partial side view of the trailer and the suspension device of FIG. 1.

Referring to the drawings and more particularly to FIGS. 1 and 2, a frame 1 of a trailer is equipped with a suspension device 41 according to the invention.

The suspension device 41 is mounted on either side of a trailer and includes a suspension arm 2 whose free outboard end supports a spindle 3 onto which a wheel 4 is rotatably mounted. As illustrated in FIG. 2, the inboard end of the suspension arm 2 is interconnected with the frame 1 by means of a pin 5. The pin 5 is parallel to the longitudinal axis of the spindle 3 and is supported by a fixed bracket 6 (FIG. 3).

Figure 3:
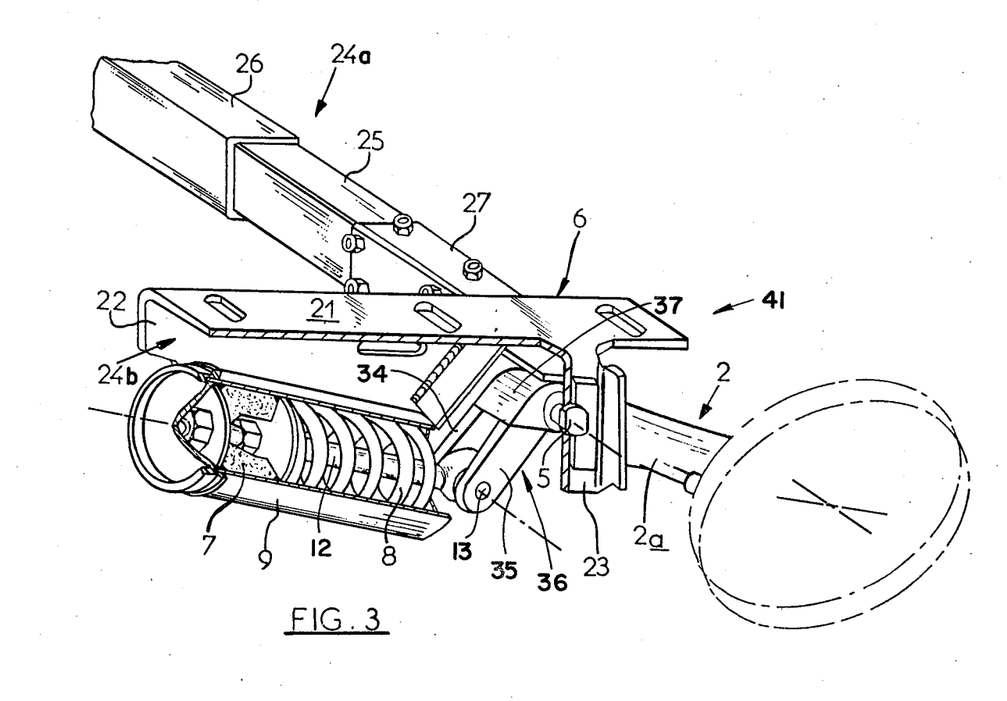
FIG. 3 is a partial perspective view of the suspension device of FIGS. 1 and 2.
Figure 5:
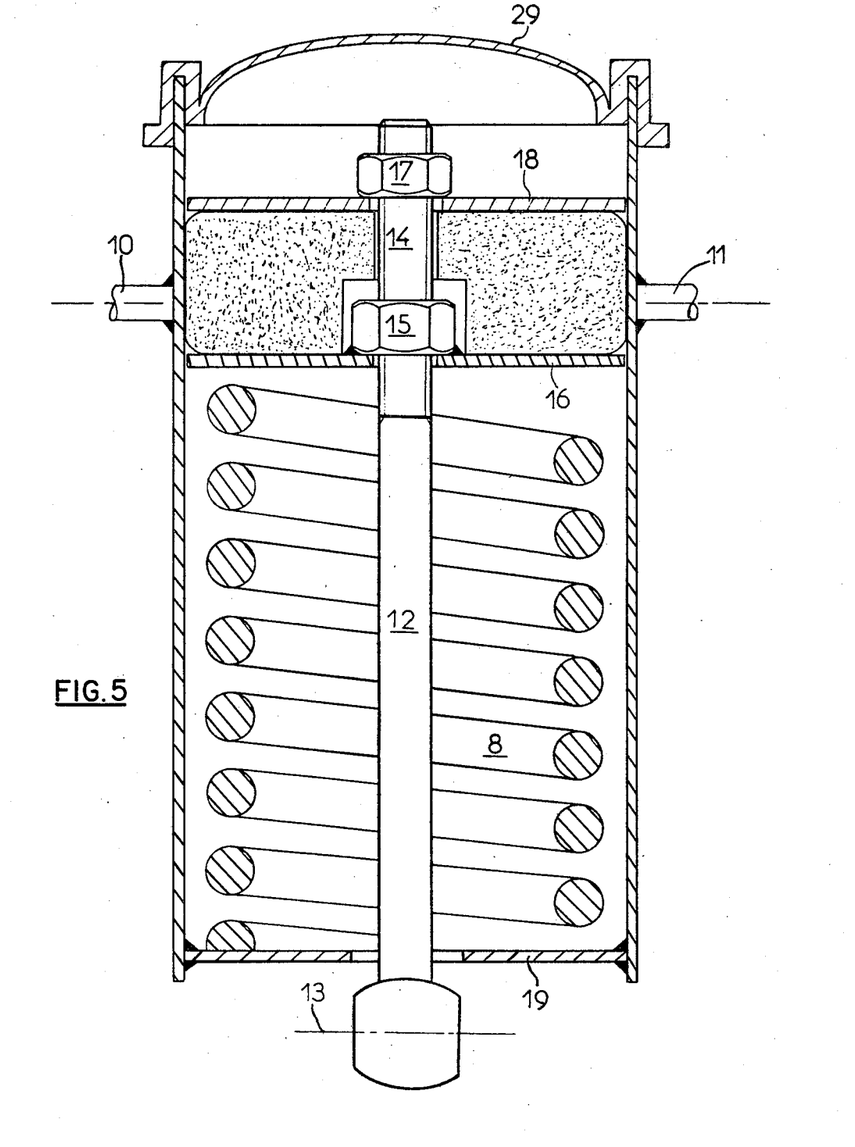
FIG. 5 is an axial sectional view of the suspension device.

As shown in FIG. 3, a shock absorbing device consisting of a soft material block 7 having two faces 43 and 44 (FIG. 5) and a resilient element, consisting of a helical spring 8. The block 7 and the spring 8 are mounted inside a common tubular housing 9 of circular cross-section, and are interconnected with the fixed bracket 6 by means of a pivot which includes two pins 10 and 11 (FIG. 5). A push rod 12 is attached at a first one of its ends to the soft material block 7 and extends through the longitudinal center of the helical spring 8, and slides axially in the tubular housing 9. The push rod 12 is further interconnected at the second one of its ends with the suspension arm 2, as described later in detail, by means of a third pin 13 (FIGS. 3 and 5) disposed parallel with the pins 5, 10 and 11. The push rod 12 includes on its first end, as best depicted in FIG. 5, a threaded portion 14 threadably passed through a nut 15 which is rigidly attached, for example by welds 42, to an intermediary washer 16, and is threaded onto an other nut 17. The intermediary washer 16 slides freely within the tubular housing 9. The intermediary washer 16 is pinched between a first end of the helical spring 8 and one face 43 of the soft material block 7. The nut 17 presses a thrust washer 18 against the other face 44 of the soft material block 7. The washers 16 and 18 are movably housed inside the tubular housing 9. The second end of the helical spring 8 rests against a stop piece 19 which is rigidly mounted in the tubular housing 9. The stop piece 19 has a central hole 38 through which the second end of the push rod 12 may be inserted.

Figures 6, 7:
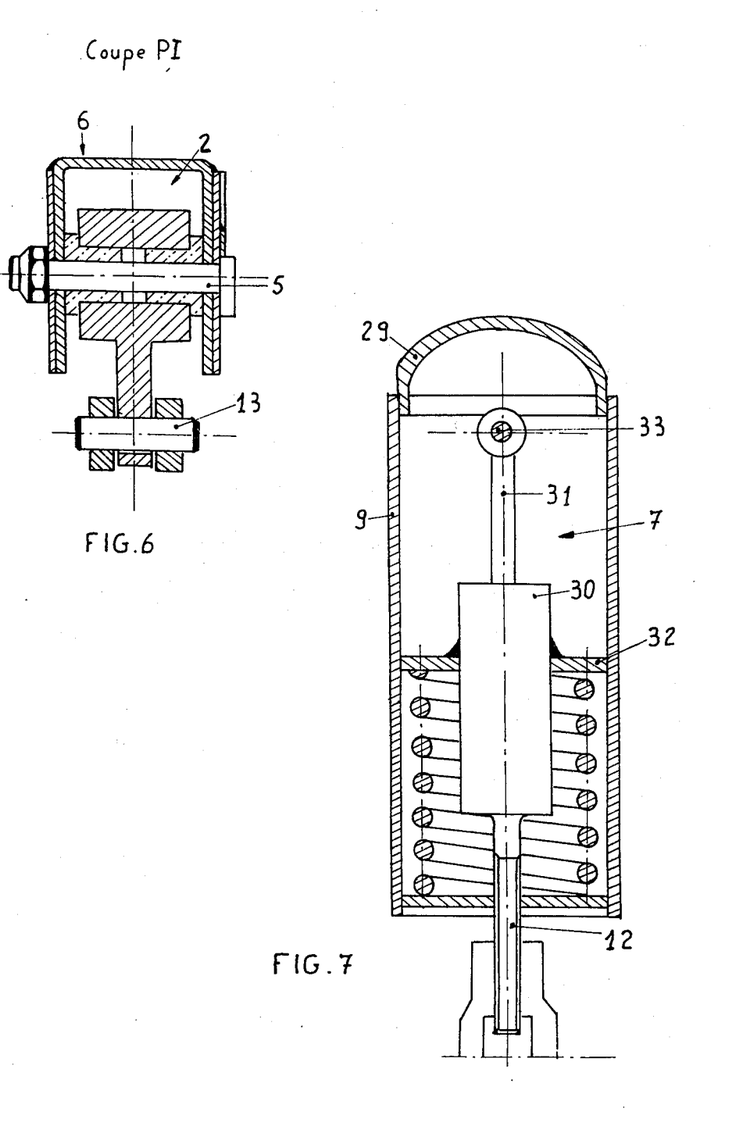
FIG. 6 is a sectional view taken along line 6—6 of FIG. 2.
FIG. 7 is an axial sectional view similar to FIG. 5 but illustrating an assembly variation for the shock absorbing element and the elastic element of the suspension device.

A bracket 36, shown in FIGS. 2, 3, and 6, is provided between the second end of the push rod 12 and the suspension arm 2. The bracket 36 consists of a bifurcated element having two arms 34 and 35 and fixed, for example by welds, to a hub 37 of the suspension arm 2. The second end of the push rod 12 is thereby inserted between the arms 34 and 35 of the bracket 36 and is pivotally mounted therebetween by means of the pin 13, described above, passed progressively through apertures in the arm 34, the push rod 12 and the arm 35.

The shape of the suspension arm 2 is such that the plane passing through the longitudinal axis of the pin 5 and the longitudinal axis of the spindle 3, and the plane passing through the longitudinal axis of the pin 5 and the longitudinal axis of the pin 13 define therebetween a diherdal angle $\alpha$ (FIG. 2). Furthermore the suspension arm 2 includes, between the spindle 3 and the pin 5, a main branch 2a (FIG. 3) which is slightly bent and offset towards the vehicle relative to the remainder of the suspension arm.

The construction of the assembly described above is such that the tubular housing 9 extends in front of the pin 13 while remaining slightly slanted when oscillating about the rotational axis defined by the pins 10 and 11 in response to the oscillations of the suspension arm 2.

The fixed bracket 6, best illustrated in FIG. 3, includes a straight longitudinal gutter whose opening is directed downwardly. The base 21 of this gutter is welded under the frame 1. The two opposite walls 22 and 23 of the gutter define therebetween a recess 24b which houses the various above described elements of the suspension device. In particular, the pins 5, 10, and 11 are rigidly mounted to the walls 22 and 23. In the preferred embodiment, the wall 22, facing the median axis of the vehicle, externally supports an optional transverse lug 27. An optional cross member 24a acting as a stiffener between the two symmetrical portions of the suspension device 41 can be provided between the lugs 27 of both fixed brackets 6 of the device.

Figure 4:
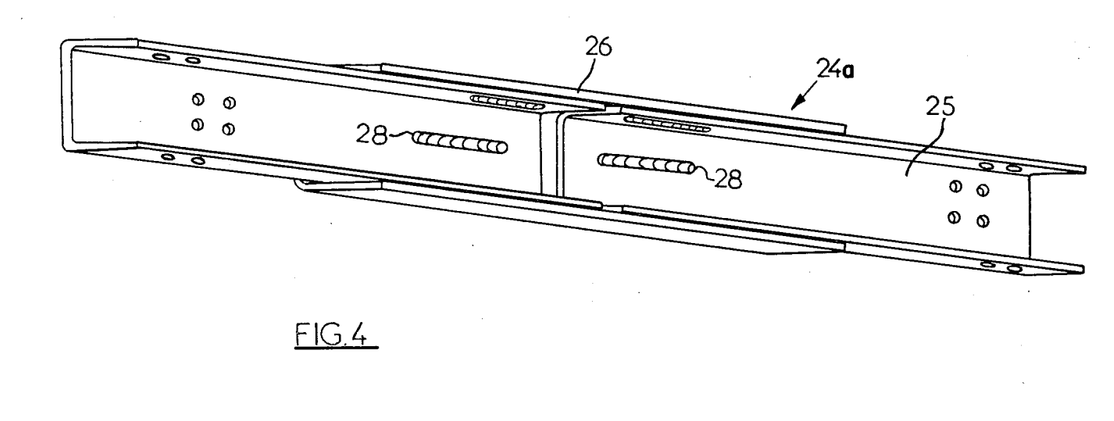
FIG. 4 is a partial elevational view of the suspension device cross member.

The cross member 24a includes three elements, its two extreme elements 25 being inserted inside an intermediary element 26. This cross member constitutes a sliding assembly which is to be welded together during the assembly operation after adjustment for the width between the fixed brackets 6. Since each extreme element 25 is rigidly interconnected with a lug 27, the extreme elements 25 are to be welded at the end of the operation onto the intermediary element 26, using for example, weld seams 28, as shown in FIG. 4.

The device according to the present invention operates as follows:

The device is mounted under the frame of the vehicle and constitutes an independent wheel type suspension with built-in shock absorbers. The cross member 24a acts as a stiffener between the two fixed brackets 6. The ground clearance of the vehicle may be adjusted by calibrating the helical spring 8, as for example tightening or backing off the nuts 15 on the push rod 12, as required. This operation requires the preliminary removal of a cover or plug 29 from the end of the tubular housing 9 opposite the stop piece 19, as well as the removal of the nut 17, the thrust washer 18 and the soft material block 7 from the housing.

The only operation required to adjust the elasticity of the shock absorbers consists of removing the plugs 29 and rotating the nuts 17 on the push rods 12 in the required direction. When the adjustment is satisfactory, the plugs 29 may be reinstalled. This adjustment causes a variation in the axial compression of the soft material block 7 between the washers 16 and 18. As the axial pressure applied to the block 7 increases, its diameter increases accordingly thus causing an increased amount of friction between the block and the internal wall surface of the tubular housing 9.

In an alternate embodiment, not illustrated in the drawing, the helical spring 8 which represents the elastic element may be replaced by a pneumatical spring or by a rubber spring.

The novel suspension device 41 of the present invention offers several advantages. The ground clearance of the vehicle may be adjusted as desired depending on the load on the vehicle. The elasticity of the block 7 may be adjusted as desired independently of the ground clearance selected. The same assembly of elements described above may be mounted on vehicles having a wide range of wheel base measurements without any modification, thus reducing the inventory of the manufacturer.

According to the alternate embodiment of the suspension device 41' illustrated in FIG. 7, the block 7 consists of a shock absorbing cylinder body 30 and a sliding rod 31 which may be selected from well known prior art elements. The front end of a spring 39 abuts against a washer 32 welded around the cylinder body 30 so as to take the place of the washer 16 in the device illustrated in FIG. 5. The first end of the push rod 12' is welded at 20 to the center of the bottom. The second end of the push rod 12' is threaded into a bracket 40 which is, in turn, mounted on the pin 13. The bracket 40 may be rotated to adjust the compression of the spring 39 to provide adjustment of the suspension device. The free end of the sliding rod 31 is mounted to a pivot 33 which is attached across and close to the front of the tubular housing 9, and inside thereof. Any type of hydraulic shock absorber may be used as the shock absorbing cylinder.

According to a further alternate embodiment, the tubular housing 9 is welded on the fixed bracket 6 by means of lateral weld seams which are generally orientated lengthwise. The operation principle remains unchanged. Although the tubular housing 9 no longer swivels, experience shows that this does not affect the proper operation of the device in any way.

The above description is by way of example and not by way of limitation. Various modifications will be apparent to those skilled in the art after reviewing the present description and are intended to be included within the scope of the appended claims.

It should be noted that in the claims appended hereto, several similar elements are recited, including more than one abutment means, link members, and shock absorbing members. For ease of interpretation of the claims and in order to distintguish between these elements, these elements have been assigned numbers such as to be "first" or "second". Such numbering has been separately and consecutively established within each claim and, accordingly, it is not necessarily intended that any of the claims refer to the identical element with the same preceeding numbers as in any of the other claims except for those claims on which it depends.

What is claimed as novel is as follows:

1. A vehicle suspension device for supporting a vehicle frame on a wheel, said vehicle suspension device comprising:
   a suspension arm pivotally mounted to said vehicle frame so as to pivot about a first predetermined axis, said wheel being rotatably mounted to said suspension arm so as to rotate relative to said suspension arm about a second predetermined axis parallel to said first predetermined axis and spaced predetermined distance therefrom;
   a first link member having a first end and a second end, said first end being pivotally fastened to said vehicle frame so as to pivot about a third predetermined axis parallel to both of said first and second predetermined axes and spaced apart therefrom;
   a second link member having a first end and a second end, said first end of said second link member being pivotally fastened to said suspension arm so as to pivot about a fourth predetermined axis parallel to said first, second and third predetermined axes and spaced a predetermined angular amount from the plane of said first and second predetermined axes, and said second end of said second link member being reciprocably interconnected with said second end of said first link member; and
   shocks absorbing means interposed between said second end of said first link member and said second end of said second link member so as to absorb reciprocal oscillatory energy between said first and second link members.

2. The vehicle suspension device of claim 1 further comprising a bracket interposed between said vehicle frame and said suspension arm and further interposed between said vehicle frame and said first link member, said bracket being fixedly secured to said vehicle frame and said suspension arm, and said first link member being pivotally fastened to said bracket.

3. The vehicle suspension device of claim 2 comprising two of said brackets, two of said suspension arms, two each of said first and second link members and two of said shock absorbing means and further comprising an elongated support member having two ends, each of said ends being rigidly interconnected with one of said brackets so that said vehicle suspension device interconnects two wheels on opposite sides to said vehicle frame and is interposed therebetween.

4. The vehicle suspension device of claim 3 wherein said elongated support member is adjustable between two extreme predetermined wheel base measurements.

5. The vehicle suspension device of claim 2 wherein said bracket comprises a U-shaped member having a base portion fixedly secured to said vehicle frame and flange portions extending from said base portion, said suspension arm and said first link member each being pivotally fastened to said bracket between said flange portions.

6. A vehicle suspension device for supporting a vehicle frame on a wheel, said vehicle suspension device comprising:
   a suspension arm pivotally mounted to said vehicle frame so as to pivot about a first predetermined axis, said wheel being rotatably mounted to said suspension arm so as to rotate relative to said suspension arm about a second predetermined axis parallel to said first predetermined axis and spaced a predetermined distance therefrom;
   a first shock absorbing member having a first end and a second end, said first end being pivotally fastened to said vehicle frame so as to pivot about a third predetermined axis parallel to both of said first and second predetermined axes and spaced apart therefrom; and
   a second shock absorbing member having a first end and a second end, said first end of said second shock absorbing member being pivotally fastened to said suspension arm so as to pivot about a fourth predetermined axis parallel to said first, second and third predetermined axes and spaced a predetermined angular amount from the plane of said first and second predetermined axes, and said second end of said second shock absorbing member being reciprocably interconnected with said second end of said first shock absorbing member; wherein one of said first and second shock absorbing members comprises a hollow elongated member and having a longitudinal axis, an elongated passageway extending therealong, and an elongated wall surrounding said passageway wherein the other of said first and second shock absorbing members further comprises a push rod movably received within said elongated passageway of said hollow elongated member.

7. The vehicle suspension device of claim 6 wherein said shock absorbing means comprises a block of resilient material interconnected with said second end of said other shock absorbing member and frictionally engaging said elongated wall of said one shock absorbing member.

8. The vehicle suspension device of claim 7 further comprising adjustment means selectively operable to adjust the level of friction between said block of resilient material and said elongated wall.

9. The vehicle suspension device of claim 8 wherein said adjustment means comprises a first and second abutment means interconnected with said other shock absorbing member of said first and second shock absorbing members proximate said second end thereof, said block of resilient material being disposed therebetween, and wherein at least one of said first and second abutment means is selectively movable relative to the other of said first and second abutment means to compress said block of resilient material a predetermined amount therebetween.

10. The vehicle suspension device of claim 9 further comprising third abutment means on said one shock absorbing member of said first and second shock absorbing members proximate said second end thereof, spring means interposed between said second abutment means and said third abutment means, and height adjustment means selectively operable to move one of said second and third abutment means relative to its respective shock absorbing member to adjust the nominal height of said vehicle frame relative to said wheel.

11. The vehicle suspension device of claim 10 wherein both of said first and second link members further comprise abutment means proximate their respective second ends and wherein said vehicle suspension device further comprises spring means interposed said abutment means biasing said second ends away from each other.

12. The vehicle suspension device of claim 11 further comprising wheel height adjustment means selectively operable to move one of said abutment means relative to its respective link member to adjust the distance between said respective seconds ends thereof and, thus, to adjust the nominal height of said vehicle frame relative to said wheel.

13. The vehicle suspension device of claim 1 further comprising adjustment means selectively operable to adjust the level of friction of said shock absorbing means interposed between said first and second link members.

14. The vehicle suspension device of claim 6 wherein said one shock absorbing member comprises a cylinder.

15. The vehicle suspension device of claim 1 wherein said first link member comprises a hollow cylinder having a cylindrical wall and a longitudinal axis and said second link member comprises an elongated rod inserted partially into said hollow cylinder and further wherein said shock absorbing means further comprises a block of resilient material interconnected with said second end of said elongated rod and frictionally engaging said cylindrical wall of said hollow cylinder.

16. The vehicle suspension device of claim 15 further comprising:
   first abutment means movably interconnected with said elongated rod;
   second abutment means movably interconnected with said elongated rod and spaced a predetermined distance from said first abutment means towards said second end of said elongated rod, said shock absorbing means comprising a block of resilient material interposed between said first and second abutment means;
   third abutment means interconnected with said hollow cylinder and extending inwardly from said second end of said cylindrical wall towards said longitudinal axis,
   spring means interposed said first and said third abutment means biasing said first and third abutment means away from each other; and
   height adjustment means selectively operable to move one of said second and third abutment means relative to its respective shock absorbing member to adjust the nominal height of said vehicle frame relative to said wheel.

17. A vehicle suspension device for supporting the vehicle frame on a wheel, said vehicle suspension device comprising:
   a first shock absorbing member comprising a hollow elongated member having a longitudinal axis, an elongated passageway along said longitudinal axis, an elongated wall surrounding said elongated passageway and an inlet into said passageway;
   a second shock absorbing member comprising a push rod having a portion extended through said inlet and movably received within said elongated passageway of said hollow elongated member;
   first abutment means on said first shock absorbing member and extending inwardly therefrom at a location adjacent said inlet;
   second abutment means interconnected with said portion of said second shock absorbing member;
   spring means interposed said second abutment means and said first abutment means and disposed within said elongated passageway of said first shock absorbing member, said spring means biasing said first and second abutment means away from each other;
   third abutment means interconnected with said portion of said second shock absorbing member and spaced a predetermined distance from said second abutment means on the side of said second abutment means remote from said spring means; and
   shock absorbing means interposed between said second abutment means and said third abutment means and frictionally engaging said elongated wall of said first shock absorbing member, such that, one of said shock absorbing members is interconnected with said vehicle frame and the other of said shock absorbing members is interconnected with said wheel.

18. The vehicle suspension device of claim 17 wherein said second abutment means is selectively adjustable relative to said second shock absorbing member so as to provide an adjustment in height between said vehicle frame and said wheel.

19. The vehicle suspension device of claim 17 wherein said third abutment means is selectively adjustable relative to said second shock absorbing member and wherein said shock absorbing means comprises a block of resilient material so that abutment of said third adjustment means relative to said second abutment means provides an adjustment in the level of friction between said shock absorbing means and said first shock absorbing member.

20. The vehicle suspension device of claim 17 wherein said spring means comprises a helical spring wound about said second shock absorbing member.

* * * * *